(12) United States Patent
Totani

(10) Patent No.: US 8,997,817 B2
(45) Date of Patent: Apr. 7, 2015

(54) PLASTIC BAG MAKING APPARATUS

(75) Inventor: Mikio Totani, Kyoto (JP)

(73) Assignee: Totani Corporation, Kyoto (JP)

( * ) Notice: Subject to any disclaimer, the term of this patent is extended or adjusted under 35 U.S.C. 154(b) by 412 days.

(21) Appl. No.: 13/429,955

(22) Filed: Mar. 26, 2012

(65) Prior Publication Data

US 2013/0068392 A1    Mar. 21, 2013

(30) Foreign Application Priority Data

Mar. 30, 2011    (JP) .................................. 2011-075333

(51) Int. Cl.
| | | |
|---|---|---|
| B31B 1/00 | (2006.01) | |
| B32B 41/00 | (2006.01) | |
| B29C 65/00 | (2006.01) | |
| B29C 65/78 | (2006.01) | |

(52) U.S. Cl.
CPC ................. *B31B 1/00* (2013.01); *Y10T 156/12* (2015.01); *B29C 66/43122* (2013.01); *B29C 66/43123* (2013.01); *B32B 2041/06* (2013.01); *B32B 41/00* (2013.01); *B29C 66/40* (2013.01); *B29C 66/43121* (2013.01); *B29C 65/7832* (2013.01); *B31B 2219/88* (2013.01); *B31B 2219/95* (2013.01)

(58) Field of Classification Search
CPC ................. B29C 65/7832; B29C 66/40; B29C 66/43121; B29C 66/43122; B29C 66/43123; B31B 1/00; B31B 2219/88; B31B 2219/95; B32B 41/00; B32B 2014/06; Y10T 156/12

USPC ............ 156/378, 510, 367, 368; 53/127, 559; 493/129, 133, 189, 190, 191, 195, 196, 493/197

See application file for complete search history.

(56) References Cited

FOREIGN PATENT DOCUMENTS

| | | |
|---|---|---|
| EP | 0481137 A1 | 4/1992 |
| JP | 7-43428 | 8/1995 |
| JP | 2002-326295 | 11/2002 |
| JP | 2008-169017 | 7/2008 |
| JP | 2010-105186 | 5/2010 |
| JP | 2010105186 | 5/2010 |

OTHER PUBLICATIONS

Translation of JP 2010-105186, published May 13, 2010. Inventor Kitamura Yoshiki.*
Translation of JP 2008-169017, published Jul. 24, 2008. Inventor Matsui Takayoshi et al.*

* cited by examiner

*Primary Examiner* — George Koch
(74) *Attorney, Agent, or Firm* — Kirschstein, et al.

(57) ABSTRACT

An apparatus makes plastic bags in succession by intermittently feeding webs of plastic film longitudinally along a path. Movable units are spaced apart along the path and are driven by drive units, one for each movable unit, longitudinally of the film webs. Control switches, one for each movable unit, works on each drive unit to move the corresponding movable unit for position adjustment. The film webs are processed by at least some of the movable units whenever being fed intermittently, to successively make the plastic bags.

6 Claims, 3 Drawing Sheets

PLASTIC BAG MAKING APPARATUS

TECHNICAL FIELD

The invention relates to an apparatus for successively making plastic bags of plastic film.

BACKGROUND

Japanese Laid Open Patent Publication No. 2010-105186 discloses an apparatus for successively making plastic bags of plastic film. The apparatus includes feeding means by which webs of plastic film are fed longitudinally thereof and intermittently for a length and along a path. The plastic bag has a size corresponding to the length. The apparatus further includes a plurality of movable units spaced from each other along the path. The movable units are supported for movement longitudinally of the webs of plastic film. The apparatus further includes a plurality of drive means each of which is mounted on each of the movable units for moving each of the movable units. The webs of plastic film are processed by at least some of the movable units to successively make the plastic bags. For example, the movable units comprise a longitudinal heater, a longitudinal cooler, a cross heater, a cross cooler and a cutter. The webs of plastic film are longitudinally heat sealed, cooled, cross heat sealed, cooled and cut by the longitudinal heater, the longitudinal cooler, the cross heater, the cross cooler and the cutter whenever being fed intermittently, to successively make the plastic bags.

In addition, the webs of plastic film are printed with a pattern over again. The movable units further comprise upstream and downstream optical sensors disposed upstream and downstream of the cross heater. The upstream or downstream optical sensor detects a position at which the webs of plastic film are printed, whenever the webs of plastic film are fed intermittently, to make the webs of plastic film stopped. The webs of plastic film are longitudinally heat sealed, cooled, cross heat sealed, cooled and cut after being stopped.

Furthermore, one of the movable units constitutes a point of reference. If the webs of plastic film suffer, extension or contraction when operating the apparatus, a control device controls the drive means to move the movable units for distances except the movable unit constituting the point of reference, after the webs of plastic film are stopped. The control device calculates the distances of moving the movable units in accordance with the extension or contraction of the webs of plastic film, before moving the movable units so that the distances can be proportional to intervals from the point of references to correspond to the extension or contraction of the webs of plastic film. It should therefore be understood that regardless of the extension or contraction, the webs of plastic film are longitudinally heat sealed, cooled, cross heat sealed, cooled and cut with accuracy.

By the way, the extension or contraction aside, the apparatus has problems about the positions of movable units. For example, the movable units are not always disposed in positions before operating the apparatus. An operator has therefore to move the movable units by hand for adjustment of position. In particular, the operator has often to move the cross heater and the cross cooler by hand for adjustment of position. In addition, it is conventional to change the size of plastic bag. In this case, the operator has to move the movable units by hand for adjustment of position so that the movable units can be spaced from each other for a distance corresponding to the size of plastic bag, taking labor and time.

It is therefore an object of the invention to provide an apparatus including a plurality of movable units to successively make plastic bags of plastic film, which can move the movable units for adjustment of position without difficulty before operating the apparatus.

SUMMARY OF THE INVENTION

According to the invention, the apparatus includes feeding means by which webs of plastic film are fed longitudinally thereof and intermittently along a path. The apparatus further includes a plurality of movable units spaced from each other along the path. The movable units are supported for movement longitudinally of the webs of plastic film. The apparatus further includes a plurality of drive means each of which is mounted on each of the movable units for moving each of the movable units. In addition, the apparatus includes a plurality of control switches, each of the movable units being provided with each of the control switches. Each of the control switches corresponds to each of the movable units. Each of the control switches works on each of the drive means to move the corresponding unit for adjustment of position when being actuated. The webs of plastic film are processed by at least some of the movable units whenever being fed intermittently, to successively make the plastic bags.

In a preferred embodiment, the movable units comprise a longitudinal heater, a longitudinal cooler, a cross heater, a cross cooler and a cutter. The webs of plastic film are longitudinally heat sealed, cooled, cross heat sealed, cooled and cut by the longitudinal heater, the longitudinal cooler, the cross heater, the cross cooler and the cutter whenever being fed intermittently, to successively make the plastic bags.

The webs of plastic film are printed with a pattern over again. The movable units further comprises upstream and downstream optical sensors disposed upstream and downstream of the cross heater. The upstream or downstream optical sensor detects a position at which the webs of plastic films are printed, whenever the webs of plastic film are fed intermittently, to make the webs of plastic film stopped.

Each of the control switches comprises an independent move switch actuated to move the corresponding unit singly.

Each of the control switches may comprise an interlocking move switch in addition to the independent move switch. The interlocking move switch is actuated to move the corresponding unit along with other units.

One of the movable units may constitute a point of reference. The interlocking move switch is actuated to move the corresponding unit along with other units for distances proportional to intervals from the point of reference, except the movable unit constituting the point of reference.

The interlocking move switch may be actuated to move the corresponding unit and other units for a distance.

The interlocking move switch may be actuated to move the longitudinal heater and the longitudinal cooler and move the cross heater and the cross cooler.

BEST MODE TO CARRY OUT THE INVENTION

Figure 1:
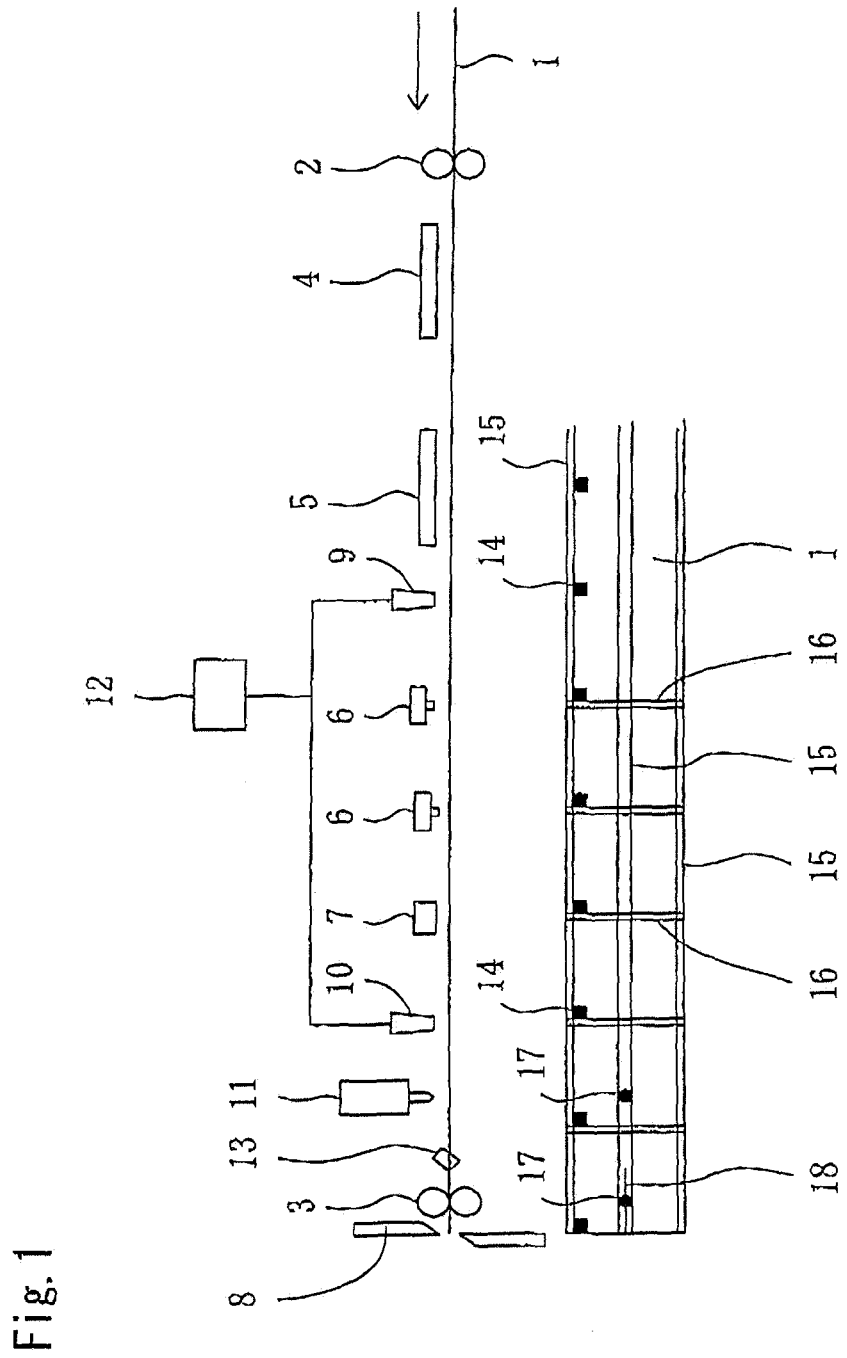
FIG. 1 is an explanatory view of a preferred embodiment of the invention.

Turning now to the drawings, FIG. 1 illustrates an apparatus for successively making plastic bags of plastic film, according to the invention. The apparatus includes feeding means by which webs of plastic films 1 are superposed on each other and fed longitudinally thereof and intermittently along a path. The webs of plastic film 1 are printed with a pattern over again at a pitch predetermined longitudinally of the webs of plastic film 1, to successively make the plastic bags printed with the pattern, as in the case of the apparatus of Japanese Laid Open Patent Publication No. 2010-105186. The webs of plastic film 1 are fed intermittently for a length corresponding to the pitch. The plastic bag has a size corresponding to the length. The feeding means comprises feeding rollers 2 and 3 by which the webs of plastic film 1 are fed intermittently, as also in the case of the apparatus of the publication.

The apparatus further includes a plurality of movable units spaced from each other along the path along which the webs of plastic film 1 are fed. The movable units are supported for movement longitudinally of the webs of plastic film 1. In the embodiment, the movable units comprise a longitudinal heater 4, a longitudinal cooler 5, a cross heater 6, a cross cooler 7 and a cutter 8. The movable units further comprise upstream and downstream optical sensors 9 and 10 and a punch 11. The upstream and downstream optical sensors 9 and 10 are disposed upstream and downstream of the cross heater 6 and the cross cooler 7. It should therefore be understood that the longitudinal heater 4, the longitudinal cooler 5, the upstream optical sensor 9, the cross heater 6, the cross cooler 7, the downstream optical sensor 10, the punch 11 and the cutter 8 are spaced from each other along the path. They are spaced from each other for a distance corresponding to the pitch or the integral multiple thereof. The webs of plastic film 1 are printed with the pattern over again at the pitch, as described previously. In addition, the cross heater 6 comprises a plurality of separated heaters spaced from each other for a distance corresponding to the pitch. It should also be understood that the longitudinal heater 4, the longitudinal cooler 5, the upstream optical sensor 9, the cross heater 6, the cross cooler 7, the downstream optical sensor 10, the punch 11 and the cutter 8 are supported for movement longitudinally of the webs of plastic film 1.

The apparatus further includes a plurality of drive means each of which is mounted on each of the movable units for moving each of the movable units. For example, the drive means comprises a motor, a pinion and a rack mounted on the longitudinal heater 4, the longitudinal cooler 5, the upstream optical sensor 9, the cross heater 6, the cross cooler 7, the downstream optical sensor 10, the punch 11 and the cutter 8 respectively, as in the case of the apparatus of the publication. The motor, the pinion and the rack are arranged to move the longitudinal heater 4. The same is true of the longitudinal cooler 5, the upstream optical sensor 9, the cross heater 6, the cross cooler 7, the downstream optical sensor 10, the punch 11 and the cutter 8. The apparatus further includes a control device 12 connected to each of the drive means.

The webs of plastic film 1 are processed by at least some of the movable units whenever being fed intermittently, to successively make the plastic bags. In the embodiment, the webs of plastic film 1 are fed intermittently by the feeding rollers 2 and 3 to be directed to the longitudinal heater 4, the longitudinal cooler 5, the upstream optical sensor 9, the cross heater 6, the cross cooler 7, the downstream optical sensor 10, the punch 11, a slitting blade 13 and the cutter 8. The webs of plastic film 1 are longitudinally heat sealed, cooled, cross heat sealed, cooled and cut by the longitudinal heater 4, the longitudinal cooler 5, the cross heater 6, the cross cooler 7 and the cutter 8 whenever being fed intermittently, to successively make the plastic bags.

Furthermore, in the embodiment, the upstream or downstream optical sensor 9 or 10 detects a position at which the webs of plastic film 1 are printed with the pattern, whenever the webs of plastic film 1 are fed intermittently, to make the webs of plastic film 1 stopped. For example, the webs of plastic film 1 are additionally printed with a mark 14 at the position over again. The downstream optical sensor 10 detects the mark 14 or the position, whenever the webs of plastic film 1 are fed intermittently, to generate a signal. The control device 12 is connected to the upstream and downstream optical sensors 9 and 10 to make the feeding rollers 2 and 3 stopped in response to the signal so that the webs of plastic film 1 can be stopped with accuracy. In addition, the apparatus includes not only the drive means but also fundamental drive means to which the control device 12 is connected to control the fundamental drive means so that the longitudinal heater 4, the longitudinal cooler 5, the cross heater 6, the cross cooler 7, the punch 11 and the cutter 8 can be brought into action by the fundamental drive means after the webs of plastic film 1 are stopped. The webs of plastic film 1 are therefore longitudinally heat sealed by the longitudinal heater 4 at a position predetermined with respect to the pattern with which the webs of plastic film 1 are printed, so that longitudinal heated portions 15 can be formed on the webs of plastic film 1. The longitudinal heated portions 15 are then cooled by the longitudinal cooler 5. The webs of plastic film 1 are cross heat sealed by the cross heater 6 at a position predetermined with respect to the pattern, so that a cross sealed portion 16 can be formed on the webs of plastic film 1. The cross sealed portion 16 is then cooled by the cross cooler 7. The punch 11 is pressed against the webs of plastic film 1 so that a notch 17 can be formed in the webs of plastic film 1. The webs of plastic film 1 are slit by the slitting blade 13 when being fed so that a slit line 18 is formed in the webs of plastic film 1. The webs of plastic film 1 are then cut by the cutter 8 at a position predetermined with respect to the pattern, to successively make the plastic bags.

In addition, one of the movable units constitutes a point of reference. If the webs of plastic film 1 suffer extension or contraction when operating the apparatus, the control device 12 controls the drive means to move the movable units for distances except the movable unit constituting the point of reference, after the webs of plastic film 1 are stopped. The control device 12 calculates the distances of moving the movable units in accordance with the extension or contraction of the webs of plastic film 1, before moving the movable units so that the distances can be proportional to intervals from the point of reference to correspond to the extension or contraction of the webs of plastic film 1. For example, the downstream sensor 10 detects the mark 14 or the position at which the webs of plastic film 1 are printed with the pattern, to make the webs of plastic film 1 stopped. The control device 12 controls the drive means to move the upstream sensor 9 after the webs of plastic film 1 are stopped, to search the mark 14 and calculate the extension or contraction. The control device 12 then calculates the distances and controls the drive means to move the movable units for the distances except the movable unit constituting the point of reference. It should therefore be understood that regardless of the extension or contraction, the webs of plastic film 1 are longitudinally heat sealed, cooled, cross heat sealed and cooled with accuracy, as in the case of the apparatus of the publication. In addition, the apparatus can make the notch 17 formed with accuracy and make the webs of plastic film 1 out with accuracy.

The apparatus further includes a plurality of control switches, each of the movable units being provided with each of the control switches. In the embodiment, each of the control switches is mounted on each of the movable units. Each of the control switches corresponds to each of the movable units. Each of the control switches works on each of the drive means to move the corresponding unit for adjustment of position when being actuated. In the embodiment, each of the control switches generates a signal when being actuated. The control device 12 is connected to the control switches to control the drive means in response to the signal and move the corresponding unit for adjustment of position.

Figure 2:
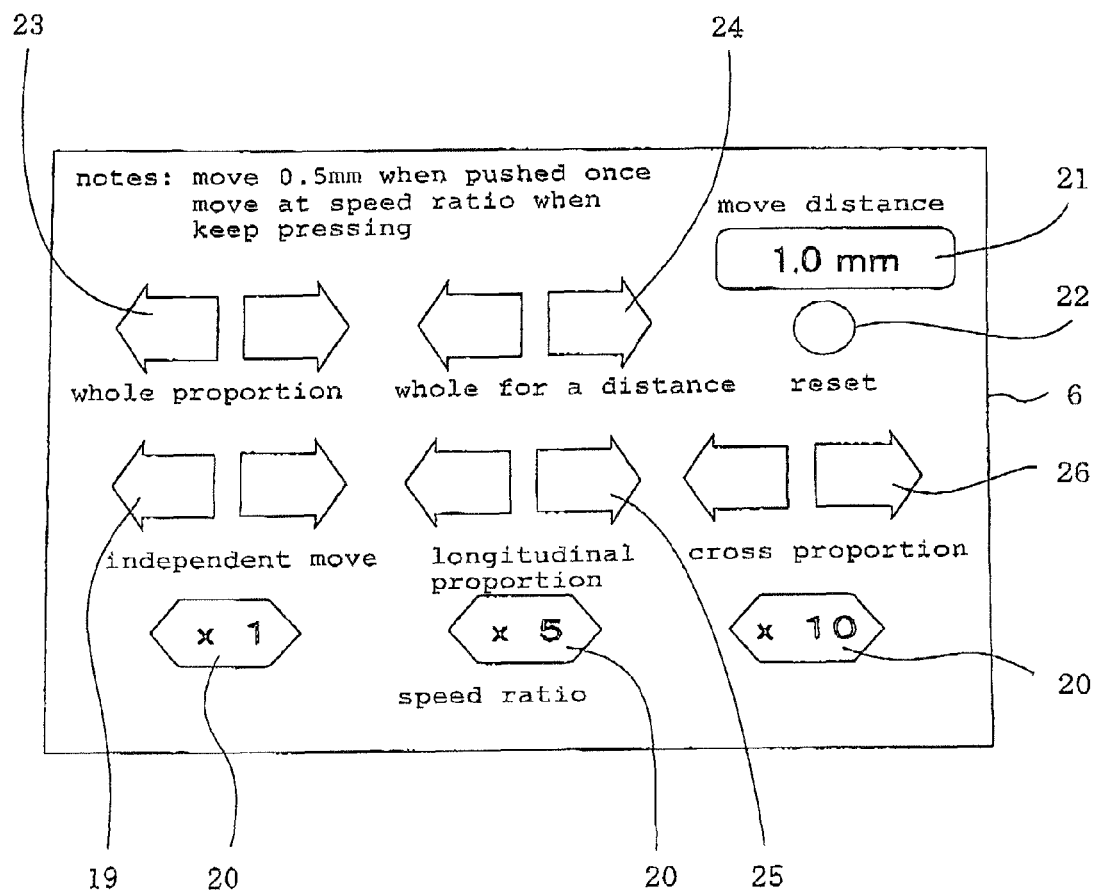
FIG. 2 is an explanatory view of the control switch mounted on the cross heater of FIG. 1.

Each of the control switches comprises an independent move switch 19 actuated to move the corresponding unit singly, as shown in FIG. 2. It should therefore be understood that each of the movable units includes the independent move switch 19 mounted thereon and actuated to move that unit singly.

The independent move switch 19 is a type of push button comprising arrows of one direction and the reverse direction. The arrow of one direction is pushed to move the corresponding unit in one direction while the arrow of the reverse direction is pushed to move the corresponding unit in the reverse direction. The independent move switch 19 is arranged to move the corresponding unit for a distance which is changed by the number of being pushed. For example, the independent move switch 19 is arranged to move the corresponding unit for a distance of 0.5 mm when being pushed once and move the corresponding unit for a distance of 1.0 mm when being pushed twice. The independent move switch 19 is further arranged to move the corresponding unit continuously when being pushed continuously. In addition, the independent move switch 19 is arranged to move the corresponding unit at a speed the ratio of which is changed and predetermined by change switches 20 before the independent move switch 19 is pushed. The distance is indicated on a indication panel 21 and reset by a reset switch 22. The change and reset switches 20 and 22 are also a type of push button.

The independent move switch 19 may be a type of touch, in which the arrow of one direction is touched to move the corresponding unit in one direction while the arrow of the reverse direction is touched to move the corresponding unit in the reverse direction. The change and reset switches 20 and 22 may also be a type of touch.

The apparatus can therefore move the movable units for adjustment of position without difficulty before operating the apparatus. For example, the cross heater 6 is provided with the independent move switch 19 mounted thereon. The control device 12 controls the drive means to move the cross heater 6 longitudinally of the webs of plastic films 1 for adjustment of position when the independent move switch 19 is actuated. An operator has therefore not to move the cross heater 6 by hand for adjustment of position. In addition, the cross heater 6 is provided with the independent move switch 19 so that the independent move switch 19 can be actuated at the position of cross heater 6. The operator can therefore utilize the independent move switch 19 without getting away from the position of cross heater 6. The operator can keep watching the position of cross heater 6 during moving the cross heater 6. The independent move switch 19 therefore make it possible to move the cross heater 6 for adjustment of position efficiently in a short time.

The cross cooler 7 is also provided with the independent move switch 19 mounted thereon. The independent move switch 19 therefore make it possible to move the cross cooler 7 for adjustment of position efficiently in a short time. The longitudinal heater 4 is also provided with the independent move switch 19 mounted thereon. The longitudinal cooler 5 is also provided with the independent move switch 19 mounted thereon. The independent move switch 19 therefore make it possible to move the longitudinal heater or cooler 4 or 5 for adjustment of position efficiently in a short time. The same is true of the upstream and downstream optical sensor 9 and 10, the punch 11 and the cutter 8.

Each of the control switches comprises an interlocking move switch 23 and an interlocking move switch 24 in addition to the independent move switch 19. The interlocking move switches 23 and 24 are actuated to move the corresponding unit along with other units.

In addition, one of the movable units constitutes a point of reference. The interlocking move switch 23 is actuated to move the corresponding unit along with other units for distances proportional to intervals from the point of reference, except the movable unit constituting the point of reference. For example, the downstream optical sensor 10 constitutes a point of reference. The interlocking move switch 23 is actuated to move the longitudinal heater 4, the longitudinal cooler 5, the upstream optical sensor 9, the cross heater 6, the cross cooler 7, the punch 11 and the cutter 8 for distances proportional to intervals from the downstream optical sensor 10. The cutter 8 may constitute a point of reference. In this case, the interlocking move switch 23 is actuated to move the longitudinal heater 4, the longitudinal cooler 5, the upstream optical sensor 9, the cross heater 6, the cross cooler 7, the downstream optical sensor 10 and the punch 11 for the distances proportional to intervals from the cutter 8.

The interlocking move switch 23 is also a type of push button or touch having the same function as the independent move switch 19. The interlocking move switch 23 is arranged to move the movable units at a speed the ratio of which is changed and predetermined by the change switches 20 and for distances which are indicated on the indication panel 21 and reset by the reset switch 22, as also in the case of the independent move switch 19.

The apparatus can therefore move the movable units for adjustment of position without difficulty when changing the size of plastic bag. For example, the downstream optical sensor 10 constitutes the position of reference. In addition, taking account of the cutter 8 provided with the interlocking move switch 23 mounted thereon, the interlocking move switch 23 is actuated at the position of cutter 8 to move the cutter 8 along with the longitudinal heater 4, the longitudinal cooler 5, the upstream optical sensor 9, the cross heater 6, the cross cooler 7 and the punch 11. As a result, such the units can be spaced from each other for a distance corresponding to the size of plastic bag. An operator can utilize the interlocking move switch 23 without getting away from the position of cutter 8. The interlocking move switch 23 therefore make it possible to move the movable units for adjustment of position efficiently in a short time.

The interlocking move switch 23 may be actuated at the position of the longitudinal heater 4, the longitudinal cooler 5, the upstream optical sensor 9, the cross heater 6, the cross cooler 7 or the punch 11 to move the corresponding unit along with other units. In any case, the movable units can be spaced from each other for a distance corresponding to the size of plastic bag. The cutter 8 may constitute the position of reference. In addition, the interlocking move switch 23 is actuated at the position of the longitudinal heater 4, the longitudinal cooler 5, the upstream optical sensor 9, the cross heater 6, the cross cooler 7, the downstream optical sensor 10 or the punch 11 to move the corresponding unit along with other units.

The interlocking move switch 24 is actuated to move the corresponding unit and other units for a distance.

The interlocking move switch 24 is also a type of push button or touch having the same function as the independent move switch 19. The interlocking move switch 24 is arranged to move the movable units at a speed the ratio of which is changed and predetermined by the change switches 20 and for a distance which is indicated on the indication panel 21 and reset by the reset switch 22, as also in the case of the independent move switch 19.

The apparatus can therefore move the movable units for adjustment of position without difficulty on a test operation for inspection of being heat sealed, when the webs of plastic film 1 are stopped. For example, the interlocking move switch 24 is actuated at the position of cross heater 6 to move the cross heater 6 and other units for a distance. Other units comprise the longitudinal heater 4, the longitudinal cooler 5, the upstream optical sensor 9, the cross cooler 7, the downstream optical sensor 10, the punch 11 and the cutter 8. An operator can therefore inspect the webs of plastic film 1 overall. The interlocking move switch 24 is then actuated at the position of cross heater 6 to move the cross heater 6 and other units in the reverse direction. The cross heater 6 is therefore returned to the original position. Other units are also returned to the original positions.

In addition, each of the control switches comprises an interlocking move switch 25 and an interlocking move switch 26 in addition to the independent move switch 19 and the interlocking move switches 23 and 24. The interlocking move switches 25 and 26 are actuated to move the longitudinal heater 4 and longitudinal cooler 5 and move the cross heater 6 and the cross cooler 7. In the embodiment, the interlocking move switch 25 is actuated to move the longitudinal heater 4 and the longitudinal cooler 5 for distances proportional to intervals from the point of reference. The interlocking move switch 25 may be actuated to move the longitudinal heater 4 and the longitudinal cooler 5 for a distance. The interlocking move switch 26 is actuated to move the cross heater 6 and the cross cooler 7 for distances proportional to intervals from the point of reference. The interlocking move switch 26 may be actuated to move the cross heater 6 and the cross cooler 7 for a distance.

The interlocking move switches 25 and 26 are also a type of push button or touch having the same function as the independent move switch 19. The interlocking move switches 25 and 26 are arranged to move the movable units at a speed the ratio of which is changed and predetermined by the change switches 20 and for a distance which is indicated on the indicatiion panel 21 and reset by the reset switch 22, as also in the case of the independent move switch 19.

An operator can therefore utilize the interlocking move switch 25 to move the longitudinal heater 4 and the longitudinal cooler 5 without moving the cross heater 6 and the cross cooler 7. The operator utilize the interlocking move switch 26 to move the cross heater 6 and the cross cooler 7 without moving the longitudinal heater 4 and the longitudinal cooler 5.

The apparatus may include a control panel on which a mode selector is mounted. The control device 12 is connected to the mode selector to select a certain mode when the mode selector is actuated. The control switch is then actuated to move the movable unit in the selected mode. For example, the control switch is actuated to move the movable unit singly when selecting an independent move mode. The control switch is actuated to move the corresponding unit along with other units when selecting an interlocking move mode. The control panel can therefore decrease the control switches in number.

Figure 3:
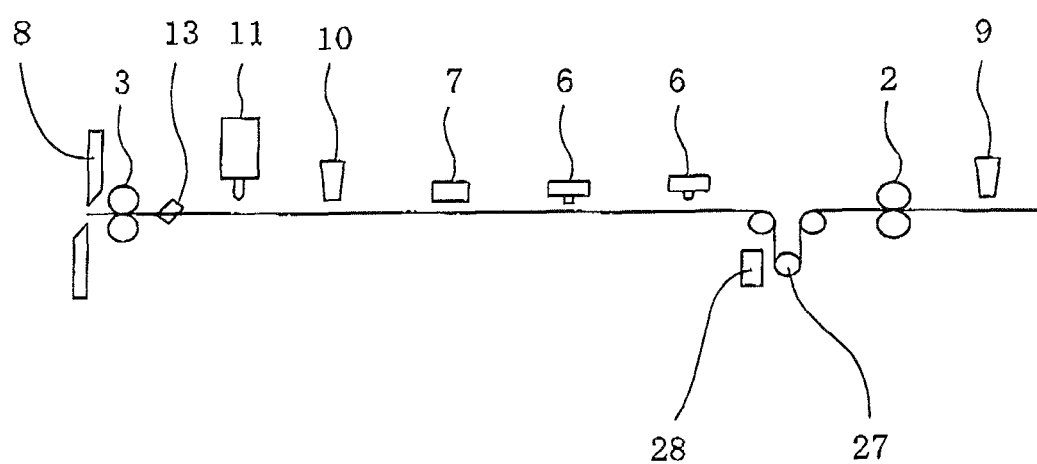
FIG. 3 is an explanatory view of another embodiment.

FIG. 3 illustrates another embodiment in which a tension roller 27 is interposed between the upstream optical sensor 9 and the cross heater 6 to be engaged with the webs of plastic film 1. The webs of plastic film 1 have a tension maintained by moving the tension roller 27 upwardly and downwardly. The apparatus includes a movement sensor 28 for detecting the movement of the tension roller 27. The feeding roller 2 is interposed between the upstream optical sensor 9 and the tension roller 27 to make the webs of plastic film 1 fed.

The longitudinal heater 4, the longitudinal cooler 5 and the upstream optical sensor 9 are spaced from each other for a distance corresponding to the pitch or the integral multiple thereof. The webs of plastic film 1 are printed with the pattern over again at the pitch, as described previously. In addition, the cross heater 6, the cross cooler 7, the downstream optical sensor 10, the punch 11 and the cutter 8 are spaced from each other for a distance corresponding to the pitch or the integral multiple thereof.

The downstream optical sensor 10 detects the mark 14 or the position at which the webs of plastic film 1 are printed with the pattern, to make the feeding roller 3 stopped while the upstream optical sensor 9 detects the mark 14 or the position at which the webs of plastic film 1 are printed with the pattern, to make the feeding roller 2 stopped. The webs of plastic film 1 are then longitudinally heat sealed, cooled, cross heat sealed and cooled by the longitudinal heater 4, the longitudinal cooler 5, the cross heater 6 and the cross cooler 7. In addition, a notch 17 is formed in the webs of plastic film 1. A slit line 18 is formed in the webs of plastic film 1. The webs of plastic film 1 are cut by the cutter 8.

In the apparatus, the webs of plastic film 1 suffer extension or contraction to move the tension roller 27. The control device 12 is connected to the movement sensor 28 to calculate the extension or contraction when the moment sensor 28 detects the movement of the tension roller 27. The control device 12 controls the drive means to move the movable units for distances except the movable unit constituting the point of reference, after the webs of plastic film 1 are stopped. The distances are proportional to intervals from the point of reference to correspond to the extension or contraction of the webs of plastic film 1. It should therefore be understood that regardless of the extension or contraction, the webs of plastic film 1 are longitudinally heat sealed, cooled, cross heat sealed and cooled with accuracy. In addition, the apparatus can make the notch 17 formed with accuracy and make the webs of plastic film 1 cut with accuracy.

The apparatus includes a plurality of control switches, each of the movable units being provided with each of the control switches, as in the case of the apparatus of FIG. 1. Each of the control switches corresponds to each of the movable units. Each of the control switches works on each of the drive means to move the corresponding unit for adjustment of position when being actuated.

Each of the control switches comprises an independent move switch 19 and interlocking move switches 23, 24, 25 and 26, as also in the case of the apparatus of FIG. 1.

The independent move and interlocking move switches 19, 23, 24, 25 and 26 are actuated to move the movable units for adjustment of position before operating the apparatus.

In each of the embodiments, each of the independent move and interlocking move switches 19, 23, 24, 25 and 26 may comprise two portions having shapes other than the arrows of one direction and the reverse direction. One of the portions is pushed or touched to move the movable unit in one direction while the other portion is pushed or touched to move the movable unit in the reverse direction.

What is claimed is:

1. An apparatus for successively making plastic bags of plastic film, the apparatus comprising:
   a feeding assembly by which webs of plastic film are fed longitudinally thereof and intermittently along a path;

a plurality of movable units spaced from each other along the path, the movable units being supported for movement longitudinally of the webs of plastic film;

a plurality of drives each of which is mounted on each of the movable units for moving each of the movable units; and a plurality of control switches, each of the movable units being provided with each of the control switches, each of the control switches corresponding to each of the movable units, each of the control switches working on each of the drives to move the corresponding unit for adjustment of position when being actuated, the webs of plastic film being processed by at least some of the movable units whenever being fed intermittently, to successively make the plastic bags, wherein each of the control switches comprises an independent move switch actuated to move the corresponding unit singly, and wherein each of the control switches comprises an interlocking move switch in addition to the independent move switch, the interlocking move switch being actuated to move the corresponding unit along with other units.

2. The apparatus as set forth in claim 1 wherein the movable units comprise a longitudinal heater, a longitudinal cooler, a cross heater, a cross cooler and a cutter, the webs of plastic film being longitudinally heat sealed, cooled, cross heat sealed, cooled and cut by the longitudinal heater, the longitudinal cooler, the cross heater, the cross cooler and the cutter whenever being fed intermittently, to successively make the plastic bags.

3. The apparatus as set forth in claim 2 wherein the webs of plastic film are printed with a pattern over again, the movable units further comprising upstream and downstream optical sensors disposed upstream and downstream of the cross heater, the upstream or downstream optical sensor detecting a position at which the webs of plastic films are printed, whenever the webs of plastic film are fed intermittently, to make the webs of plastic film stopped.

4. The apparatus as set forth in claim 1 wherein one of the movable units constitutes a point of reference, the interlocking move switch being actuated to move the corresponding unit along with other units for distances proportional to intervals from the point of reference, except the movable unit constituting the point of reference.

5. The apparatus as set forth in claim 1 wherein the interlocking move switch is actuated to move the corresponding unit and other units for a distance.

6. The apparatus as set forth in claim 1 wherein the feeding assembly comprises feeding rollers by which the webs of panel material are fed.

* * * * *